(12) United States Patent
Han et al.

(10) Patent No.: US 9,866,495 B2
(45) Date of Patent: Jan. 9, 2018

(54) METHOD AND APPARATUS FOR BUFFERING DATA

(71) Applicant: Huawei Technologies Co., Ltd., Shenzhen, Guangdong (CN)

(72) Inventors: Guanglin Han, Beijing (CN); Mingrong Cao, Bonn (DE); Zhiming Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 14/811,577

(22) Filed: Jul. 28, 2015

(65) Prior Publication Data

US 2015/0334037 A1  Nov. 19, 2015

Related U.S. Application Data

(63) Continuation of application No. PCT/CN2014/071008, filed on Jan. 21, 2014.

(30) Foreign Application Priority Data

Jan. 28, 2013  (CN) .......................... 2013 1 0031102

(51) Int. Cl.
*H04L 12/863* (2013.01)
*H04L 12/815* (2013.01)
(Continued)

(52) U.S. Cl.
CPC .......... *H04L 47/6215* (2013.01); *H04L 47/17* (2013.01); *H04L 47/22* (2013.01);
(Continued)

(58) Field of Classification Search
CPC ............ G06F 15/8007; G06F 15/8023; H03M 13/2771; H03M 13/2957; H03M 13/6566
See application file for complete search history.

(56) References Cited

U.S. PATENT DOCUMENTS 7,613,112 B2 * 11/2009 Jyske ...................... H04L 47/10
370/230
2003/0043777 A1    3/2003 Koponen et al.
(Continued)

FOREIGN PATENT DOCUMENTS

CN    101466034 A    6/2009
CN    101646204 A    2/2010
(Continued)

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 11)", 3GPP TS 36.323 V11.1.0, Dec. 2012, 27 pages.
(Continued)

*Primary Examiner* — Chandrahas Patel

(57) ABSTRACT

Embodiments of the present invention provide a method and apparatus for buffering data, which can perform highly reliable buffering processing on a received first data packet and further improve user experience. The method includes: receiving a first data packet; determining whether to perform accelerated transmission on data in the first data packet; and if it is determined not to perform accelerated transmission on the data in the first data packet, using a first manner to buffer the first data packet; and if it is determined to perform accelerated transmission on the data in the first data packet, using a second manner to buffer the first data packet, where a buffer duration in the second manner is greater than a buffer duration in the first manner. The present invention is applicable to the communications field.

14 Claims, 8 Drawing Sheets

(51) Int. Cl.
    *H04L 12/801*     (2013.01)
    *H04W 72/12*     (2009.01)
    *H04L 29/08*     (2006.01)
    *H04L 12/851*     (2013.01)
    *H04L 12/823*     (2013.01)

(52) U.S. Cl.
    CPC .......... *H04L 47/24* (2013.01); *H04L 67/2842* (2013.01); *H04W 72/1242* (2013.01); *H04L 47/32* (2013.01)

(56) References Cited

U.S. PATENT DOCUMENTS

| | | |
|---|---|---|
| 2010/0168885 A1 | 7/2010 | Li et al. |
| 2012/0044874 A1 | 2/2012 | Roenneke et al. |

FOREIGN PATENT DOCUMENTS

| | | |
|---|---|---|
| CN | 102006500 A | 4/2011 |
| CN | 102202418 A | 9/2011 |
| CN | 102323892 A | 1/2012 |
| CN | 102415157 A | 4/2012 |
| CN | 102752212 A | 10/2012 |
| CN | 102790925 A | 11/2012 |
| CN | 103413511 A | 11/2013 |
| GB | 2485348 A | 5/2012 |
| WO | WO 2007/000630 A1 | 1/2007 |
| WO | WO 2012/095259 A1 | 7/2012 |

OTHER PUBLICATIONS

Suleiman Y. Yerima, et al, "Novel Radio Link Buffer Management Schemes for End-User Multi-class Traffic in High Speed Packet Access Networks", Wireless Pers Commun, (2011), May 29, 2010, p. 349-382.

\* cited by examiner

METHOD AND APPARATUS FOR BUFFERING DATA

CROSS-REFERENCE TO RELATED APPLICATIONS

This application is a continuation of International Application No. PCT/CN2014/071008, filed on Jan. 21, 2014, which claims priority to Chinese Patent Application No. 201310031102.5, filed on Jan. 28, 2013, both of which are hereby incorporated by reference in their entireties.

TECHNICAL FIELD

The present invention relates to the communication field, and in particular, to a method and an apparatus for buffering data.

BACKGROUND

An LTE (Long Term Evolution, Long Term Evolution) base station serves as a data forwarding device. Before data received by the base station is scheduled to a UE (User Equipment, user equipment) corresponding to the data, the received data first needs to be buffered in the base station, and after a specific air interface resource is allocated to the UE by means of air interface scheduling, the base station then utilizes the resource to send the buffered data to the UE. However, buffer capacity of a base station is limited, and transmission of service data has to meet a specific delay requirement. Even if data has not been successfully sent to a UE, the base station cannot buffer received data unlimitedly. Therefore, a packet discard control mechanism is generally necessitated in a base station, to ensure that a volume of buffered data in the base station does not exceed buffer capacity of the base station, thereby preventing overflow of the buffered data.

As defined in buffer management specifications for LTE base stations, a packet discard control mechanism of a base station is implemented by using a "packet discard timer". After an LTE base station receives an IP data packet from a core network, a packet discard timer is started for the received IP data packet, where the packet discard timer is used to serve the following purposes:

control a buffer of the base station: prevent the buffer of the base station from being occupied by the IP data packet for a long time, and release buffer space in time for accepting a new IP data packet; and control an air interface transmission delay of the IP data packet: prevent the IP data packet from being buffered at the air interface for an excessively long time, and when a QoS (Quality of Service, quality of service) delay requirement is not met, prevent unnecessary data transmission and a resulting waste of bandwidth.

However, depending on time, different services have different bearer bandwidth requirements and different requirements on buffer management of a base station. For example, to accelerate playback of stream media at the initial playback moment or when fast forwarding occurs, a large amount of stream media data needs to be sent to a UE in the initial downloading phase. However, after the large amount of data arrives at the base station, the base station starts a millisecond-level packet discard timer, and the large amount of "downloaded data packets" received by the base station may be discarded by the wireless base station due to timeout being successfully transmitted to the UE. If the stream media is carried by the TCP (Transmission Control Protocol, Transmission Control Protocol), lost data is retransmitted continually due to the reliable transmission nature of the TCP, thereby substantially affecting video transmission quality and user experience.

SUMMARY

Embodiments of the present invention provide a method and apparatus for buffering data, which can perform highly reliable buffering processing on a received first data packet and further improve user experience.

To achieve the foregoing objective, the following technical solutions are adopted in the embodiments of the present invention:

According to a first aspect, a method for buffering data is provided, where the method includes:

receiving a first data packet;

determining whether to perform accelerated transmission on data in the first data packet; and if it is determined not to perform accelerated transmission on the data in the first data packet, using a first manner to buffer the first data packet; and if it is determined to perform accelerated transmission on the data in the first data packet, using a second manner to buffer the first data packet, where a buffer duration in the second manner is greater than a buffer duration in the first manner.

According to the first aspect, in a first possible implementation, the determining whether to perform accelerated transmission on data in the first data packet specifically includes:

detecting whether the first data packet carries an acceleration indication; and if the first data packet carries the acceleration indication, determining to perform accelerated transmission on the data in the first data packet; or if the first data packet does not carry the acceleration indication, determining not to perform accelerated transmission on the data in the first data packet.

According to the first possible implementation, in a second possible implementation, before the detecting whether the first data packet carries an acceleration indication, the method further includes:

receiving a start data packet detection command, where the start data packet detection command is used to instruct to detect whether a data packet carries the acceleration indication.

According to the second possible implementation, in a third possible implementation, after the receiving a start data packet detection command, the method further includes:

receiving a stop data packet detection command, where the stop data packet detection command is used to instruct to stop detection on whether a data packet carries the acceleration indication.

According to the first aspect, in a fourth possible implementation, before the receiving a first data packet, the method further includes:

receiving a start acceleration command, where the start acceleration command carries characteristic information of a data packet that needs acceleration; and the determining whether to perform accelerated transmission on data in the first data packet specifically includes:

detecting whether the characteristic information of the data packet that needs acceleration matches with characteristic information of the first data packet; and if the characteristic information of the first data packet matches with the characteristic information, carried in the start acceleration command, of the data packet that needs acceleration, determining to perform accelerated transmission on the data in the first data packet; or if the characteristic information of the first data packet does not match with the characteristic information, carried in the start acceleration command, of the data packet that needs acceleration, determining not to perform accelerated transmission on the data in the first data packet.

According to the fourth possible implementation, in a fifth possible implementation, after the receiving a start acceleration command, the method further includes receiving a stop acceleration command, where the stop acceleration command carries characteristic information of a data packet for which acceleration needs to be stopped.

According to the first aspect to the fifth possible implementation, in a sixth possible implementation, the using a first manner to buffer the first data packet specifically includes:

starting a packet discard timer of a first time length for the first data packet, and buffering the first data packet; and the using a second manner to buffer the first data packet specifically includes:

starting a packet discard timer of a second time length for the first data packet, and buffering the first data packet, where the second time length is greater than the first time length.

According to the first aspect to the fifth possible implementation, in a seventh possible implementation, the using a second manner to buffer the first data packet specifically includes:

buffering the first data packet without starting a packet discard timer.

According to the first aspect to the seventh possible implementation, in an eighth possible implementation, the method further includes:

if accelerated transmission of a data packet is supported, sending in an interface establishment process a message indicating that accelerated transmission of a data packet is supported;

or, the method further includes:

receiving an acceleration capability query message, where the acceleration capability query message is used to query whether accelerated transmission of a data packet is supported; and if accelerated transmission of a data packet is supported, sending a message indicating that accelerated transmission of a data packet is supported.

According to a second aspect, an apparatus for buffering data is provided, where the apparatus includes a receiving unit, a determining unit, and a buffering unit, where the receiving unit is configured to receive a first data packet;

the determining unit is configured to determine whether to perform accelerated transmission on data in the first data packet;

the buffering unit is configured to: if it is determined not to perform accelerated transmission on the data in the first data packet, use a first manner to buffer the first data packet; and the buffering unit is further configured to: if it is determined to perform accelerated transmission on the data in the first data packet, use a second manner to buffer the first data packet, where a buffer duration in the second manner is greater than a buffer duration in the first manner.

According to the second aspect, in a first possible implementation, the determining, by the determining unit, whether to perform accelerated transmission on data in the first data packet specifically includes:

detecting whether the first data packet carries an acceleration indication; and if the first data packet carries the acceleration indication, determining to perform accelerated transmission on the data in the first data packet; or if the first data packet does not carry the acceleration indication, determining not to perform accelerated transmission on the data in the first data packet.

According to the first possible implementation, in a second possible implementation, the receiving unit is further configured to: before the detection on whether the first data packet carries the acceleration indication, receive a start data packet detection command, where the start data packet detection command is used to instruct to detect whether a data packet carries the acceleration indication.

According to the second possible implementation, in a third possible implementation, the receiving unit is further configured to: after the receiving unit receives the start data packet detection command, receive a stop data packet detection command, where the stop data packet detection command is used to instruct to stop detection on whether a data packet carries the acceleration indication.

According to the second aspect, in a fourth possible implementation, the receiving unit is further configured to: before receiving the first data packet, receive a start acceleration command, where the start acceleration command carries characteristic information of a data packet that needs acceleration; and the determining, by the determining unit, whether to perform accelerated transmission on data in the first data packet specifically includes:

detecting whether the characteristic information of the data packet that needs acceleration matches with characteristic information of the first data packet; and if the characteristic information of the first data packet matches with the characteristic information, carried in the start acceleration command, of the data packet that needs acceleration, determining to perform accelerated transmission on the data in the first data packet; or if the characteristic information of the first data packet does not match with the characteristic information, carried in the start acceleration command, of the data packet that needs acceleration, determining not to perform accelerated transmission on the data in the first data packet.

According to the fourth possible implementation, in a fifth possible implementation, the receiving unit is further configured to: after receiving the start acceleration command, receive a stop acceleration command, where the stop acceleration command carries characteristic information of a data packet for which acceleration needs to be stopped.

According to the second aspect to the fifth possible implementation, in a sixth possible implementation, the using, by the buffering unit, a first manner to buffer the first data packet specifically includes:

starting a packet discard timer of a first time length for the first data packet, and buffering the first data packet; and the using, by the buffering unit, a second manner to buffer the first data packet specifically includes:

starting a packet discard timer of a second time length for the first data packet, and buffering the first data packet, where the second time length is greater than the first time length.

According to the second aspect to the fifth possible implementation, in a seventh possible implementation, the using, by the buffering unit, a second manner to buffer the first data packet specifically includes:

buffering the first data packet without starting a packet discard timer.

According to the second aspect to the seventh possible implementation, in an eighth possible implementation, the apparatus further includes a sending unit, where the sending unit is configured to: if accelerated transmission of a data packet is supported, send in an interface establishment process a message indicating that accelerated transmission of a data packet is supported;

or, the receiving unit is further configured to receive an acceleration capability query message, where the acceleration capability query message is used to query whether accelerated transmission of a data packet is supported; and the sending unit is configured to: if accelerated transmission of a data packet is supported, send a message indicating that accelerated transmission of a data packet is supported.

According to a third aspect, an apparatus for buffering data is provided, where the apparatus includes a receiver, a processor, and a memory, where the receiver is configured to receive a first data packet, and send the first data packet to the processor;

the processor is configured to receive the first data packet sent by the receiver, and determine whether to perform accelerated transmission on data in the first data packet;

the memory is configured to: if it is determined not to perform accelerated transmission on the data in the first data packet, use a first manner to buffer the first data packet; and the memory is further configured to: if it is determined to perform accelerated transmission on the data in the first data packet, use a second manner to buffer the first data packet, where a buffer duration in the second manner is greater than a buffer duration in the first manner.

According to the third aspect, in a first possible implementation, the determining, by the processor, whether to perform accelerated transmission on data in the first data packet specifically includes:

detecting whether the first data packet carries an acceleration indication; and if the first data packet carries the acceleration indication, determining to perform accelerated transmission on the data in the first data packet; or if the first data packet does not carry the acceleration indication, determining not to perform accelerated transmission on the data in the first data packet.

According to the first possible implementation, in a second possible implementation, the receiver is further configured to: before the processor detects whether the first data packet carries the acceleration indication, receive a start data packet detection command, and send the start data packet detection command to the processor, where the start data packet detection command is used to instruct to detect whether a data packet carries the acceleration indication.

According to the second possible implementation, in a third possible implementation, the receiver is further configured to: after receiving the start data packet detection command, receive a stop data packet detection command, where the stop data packet detection command is used to instruct to stop detection on whether a data packet carries the acceleration indication.

According to the third aspect, in a fourth possible implementation, the receiver is further configured to: before receiving the first data packet, receive a start acceleration command, where the start acceleration command carries characteristic information of a data packet that needs acceleration; and the determining, by the processor, whether to perform accelerated transmission on data in the first data packet specifically includes:

detecting whether the characteristic information of the data packet that needs accelerated transmission matches with characteristic information of the first data packet; and if the characteristic information of the first data packet matches with the characteristic information, carried in the start acceleration command, of the data packet that needs acceleration, determining to perform accelerated transmission on the data in the first data packet; or if the characteristic information of the first data packet does not match with the characteristic information, carried in the start acceleration command, of the data packet that needs acceleration, determining not to perform accelerated transmission on the data in the first data packet.

According to the fourth possible implementation, in a fifth possible implementation, the receiver is further configured to: after receiving the start acceleration command, receive a stop acceleration command, where the stop acceleration command carries characteristic information of a data packet for which acceleration needs to be stopped.

According to the third aspect to the fifth possible implementation, in a sixth possible implementation, the using, by the memory, a first manner to buffer the first data packet specifically includes:

starting a packet discard timer of a first time length for the first data packet, and buffering the first data packet; and the using, by the memory, a second manner to buffer the first data packet specifically includes:

starting a packet discard timer of a second time length for the first data packet, and buffering the first data packet, where the second time length is greater than the first time length.

According to the third aspect to the fifth possible implementation, in a seventh possible implementation, the using, by the memory, a second manner to buffer the first data packet specifically includes:

buffering the first data packet without starting a packet discard timer.

According to the third aspect to the seventh possible implementation, in an eighth possible implementation, the apparatus further includes a sender, where the sender is configured to: if accelerated transmission of a data packet is supported, send in an interface establishment process a message indicating that accelerated transmission of a data packet is supported;

or the receiver is configured to receive an acceleration capability query message, where the acceleration capability query message is used to query whether accelerated transmission of a data packet is supported; and the sender is configured to: if accelerated transmission of a data packet is supported, send a message indicating that accelerated transmission of a data packet is supported.

Embodiments of the present invention provide a method and apparatus for buffering data, where the method includes: receiving a first data packet, and determining whether to perform accelerated transmission on data in the first data packet; and if it is determined not to perform accelerated transmission on the data in the first data packet, using a first manner to buffer the first data packet; and if it is determined to perform accelerated transmission on the data in the first data packet, using a second manner to buffer the first data packet, where a buffer duration in the second manner is greater than a buffer duration in the first manner. In this method, different manners are used to buffer data packets that need accelerated transmission and those that do not need accelerated transmission, so that highly reliable buffering processing can be performed on a received first data packet, thereby improving user experience.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
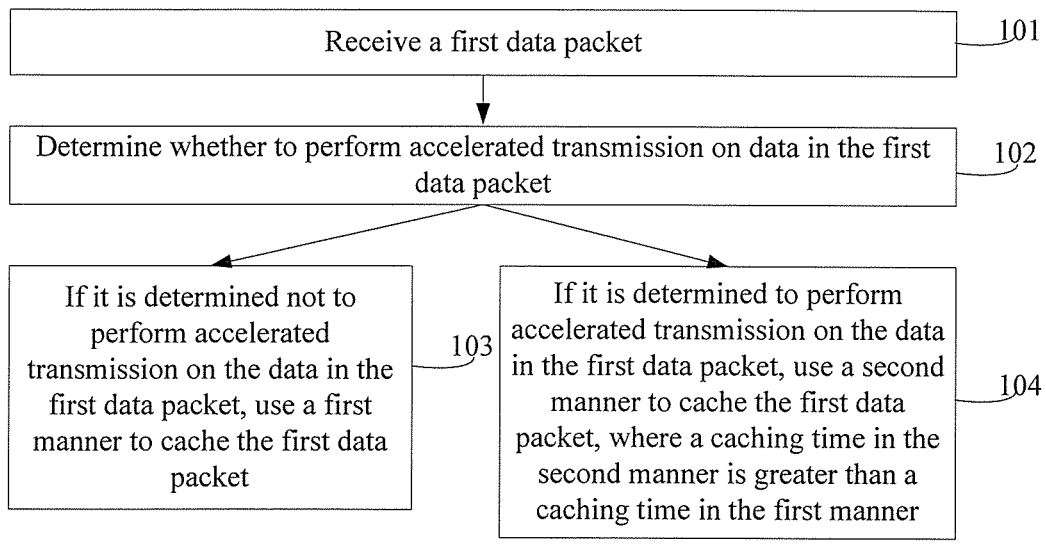
FIG. 1 shows a method for buffering data according to an embodiment of the present invention.

This embodiment of the present invention provides a method for buffering data. Specifically, as shown in FIG. 1, the method includes the following steps:

101. Receive a first data packet.

Specifically, the first data packet may be from a gateway, or may be from another network device. An apparatus that receives the first data packet may be a base station, or may be a user equipment UE. If the first data packet is received by a UE, the first data packet may be from a base station. After the base station sends the first data packet to the UE, the first data packet is stored in the application layer of the UE. In view of this, if the first data packet is received by a UE, the first data packet is from the application layer of the UE. This embodiment of the present invention does not impose specific limitations on a source of the first data packet or on the application scope of the present invention, and merely describes that the first data packet is received.

It should be noted that the first data packet does not have any special meaning and is merely used to be distinguished from the following second data packet, where the first data packet and the second data packet are different data packets that are received.

102. Determine whether to perform accelerated transmission on data in the first data packet.

Specifically, after receiving the first data packet, an apparatus needs to determine whether to perform accelerated transmission on the data in the first data packet. The determining may be performed as follows:

detecting whether the first data packet carries an acceleration indication, and if the first data packet carries the acceleration indication, determining to perform accelerated transmission on the data in the first data packet; or if the first data packet does not carry the acceleration indication, determining not to perform accelerated transmission on the data in the first data packet.

Alternatively, the determining may be performed as follows:

the apparatus receives a start acceleration command, where the start acceleration command carries characteristic information of a data packet that needs accelerated transmission, and then the apparatus detects whether characteristic information of the first data packet matches with the characteristic information, carried in the start acceleration command, of the data packet that needs acceleration;

if the characteristic information of the first data packet matches with the characteristic information, carried in the start acceleration command, of the data packet that needs acceleration, it is determined to perform accelerated transmission on the data in the first data packet; and if the characteristic information of the first data packet does not match with the characteristic information, carried in the start acceleration command, of the data packet that needs acceleration, it is determined not to perform accelerated transmission on the data in the first data packet.

Exemplarily, the characteristic information may specifically be an IP 5-tuple, namely, a source IP address, a destination IP address, a source port number, a destination port number, and a protocol type.

Apparently, the characteristic information may be other information that can identify the first data packet, and this embodiment of the present invention does not impose specific limitations on the characteristic information.

This embodiment of the present invention seeks to describe that, after receiving the first data packet, the apparatus further determines whether to perform accelerated transmission on the data in the first data packet. No specific limitation is imposed on how to determine whether to perform accelerated transmission on the data in the first data packet.

If it is determined not to perform accelerated transmission on the data in the first data packet, step 103 is performed;

if it is determined to perform accelerated transmission on the data in the first data packet, step 104 is performed.

103. If it is determined not to perform accelerated transmission on the data in the first data packet, use a first manner to buffer the first data packet.

Specifically, in the prior art, after receiving a data packet that belongs to a specific bearer, the apparatus starts a packet discard timer of a fixed time length for the received data packet, and buffers the data packet. In this embodiment of the present invention, different manners are used to buffer data packets that need accelerated transmission and those that do not need accelerated transmission.

If it is determined not to perform accelerated transmission on the data in the first data packet, the first manner is used to buffer the first data packet, and the process of using the first manner to buffer the first data packet may specifically be:

starting a packet discard timer of a first time length for the first data packet, and buffering the first data packet.

It should be noted that, in the prior art, buffer management time defined by a packet discard timer of a fixed time length is typically at a granularity of milliseconds, and this buffer management manner is suitable for a data packet that is transmitted in a common manner. Therefore, the step in which if it is determined not to perform accelerated transmission on the data in the first data packet, use the first manner to buffer the first data packet is specifically to start the packet discard timer of the first time length for the first data packet and buffer the first data packet. The first time length may be determined according to the prior art.

104. If it is determined to perform accelerated transmission on the data in the first data packet, use a second manner to buffer the first data packet, where a buffer duration in the second manner is greater than a buffer duration in the first manner.

Specifically, in this embodiment of the present invention, different manners are used to buffer data packets that need accelerated transmission and those that do not need accelerated transmission.

If it is determined to perform accelerated transmission on the data in the first data packet, the second manner is used to buffer the first data packet, and the process of using the second to buffer the first data packet may specifically be:

starting a packet discard timer of a second time length for the first data packet, and buffering the first data packet, where the second time length is greater than the first time length, and may specifically be infinite;

or buffering the first data packet without starting a packet discard timer.

It should be noted that buffer management time defined by a packet discard timer of a fixed time length in the prior art is typically at a granularity of milliseconds, and this buffer management manner is unsuitable for a data packet that needs accelerated transmission. This is because if accelerated transmission is required, a large quantity of data packets may be transmitted in the acceleration process, causing temporary bottleneck in scheduling and increasing a delay in data packet transmission. In the event that the packet discard timer of the fixed length is applied, the data packet that needs accelerated transmission may already be discarded due to timeout before being successfully transmitted to a user equipment. Therefore, if the practice of using the second manner to buffer the first data packet is specifically to start the packet discard timer of the second time length for the first data packet and buffer the first data packet, the second time length needs to be greater than the first time length, and the second time length should be long enough for the data packet that needs accelerated transmission. In which case, the apparatus discards the data packet that needs accelerated transmission only after receiving an acknowledgement message fed back by a receiver or an underlying layer to indicate successful receipt by the receiver. Specifically, if the second time length is infinite, the second time length is undoubtedly suitable for the data packet that needs accelerated transmission.

Apparently, the practice of not starting a packet discard timer may cause the data packet that needs accelerated transmission to be stored in a buffer all the time. The apparatus discards the data packet that needs accelerated transmission only after receiving an acknowledgement message fed back by a receiver or an underlying layer to indicate successful receipt by the receiver. Therefore, the practice of not starting a packet discard timer is also suitable for the data packet that needs accelerated transmission.

In addition to the method of controlling the discard timer, another buffer control technology may be used for the data packet that needs accelerated transmission, providing that the data packet that needs accelerated transmission is allowed to be stored in a buffer for a longer time, so as to avoid unnecessary data discard.

This embodiment of the present invention merely describes that the second manner is in use to buffer the data packet that needs accelerated transmission, where the buffer duration in the second manner is greater than the buffer duration in the first manner. No specific limitation is imposed on specific implementation of the second manner.

This embodiment of the present invention provides a method for buffering data, where the method includes: receiving a first data packet, and determining whether to perform accelerated transmission on data in the first data packet; and if it is determined not to perform accelerated transmission on the data in the first data packet, using a first manner to buffer the first data packet; and if it is determined to perform accelerated transmission on the data in the first data packet, using a second manner to buffer the first data packet, where a buffer duration in the second manner is greater than a buffer duration in the first manner. In this method. By using different manners to buffer data packets that need accelerated transmission and those that do not need accelerated transmission, an apparatus can perform highly reliable buffering processing on a received first data packet, thereby improving user experience.

Embodiment 2

Figure 2:
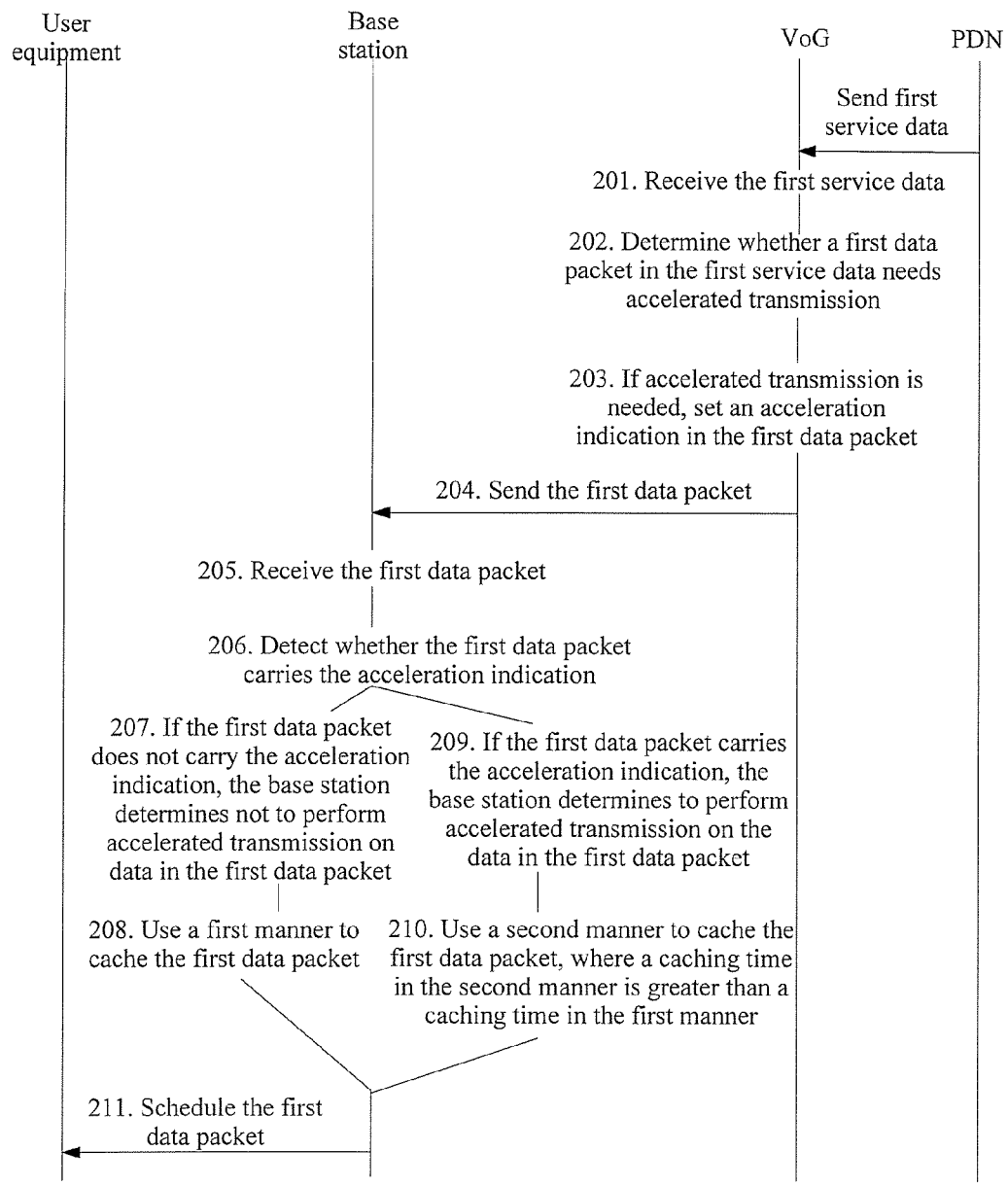
FIG. 2 illustrates a method for buffering data by a base station according to an embodiment of the present invention.

This embodiment of the present invention provides a method for buffering data. Specifically, an entire process of data packet forwarding in a video service is used as an example to describe data buffering at a base station. Specifically, as shown in FIG. 2, the method includes the following steps:

201. A VoG (Video Optimization Gateway, video optimization gateway) receives first service data sent by a PDN (Packet Data Network, packet data network).

202. The VoG determines whether a first data packet in the first service data needs accelerated transmission.

Specifically, the first service data received by the VoG includes multiple data packets. Data in some data packets may be in a time range in which accelerated transmission is needed, whereas data in some data packets does not need accelerated transmission. For example, in an initial phase of playing an on-demand video to a user, to reduce an initial wait time for the user, the VoG may perform accelerated transmission on data in the initial phase of the video playback; or, when the user accesses a random segment of the video, to reduce a wait time for the user, the VoG may perform acceleration on data in the random video segment that the user accesses. In this case, the VoG may recognize, by taking advantage of a packet detection mechanism, a data packet that needs acceleration, that is to say, the VoG may determine whether the first data packet in the first service data needs accelerated transmission.

203. If the first data packet needs accelerated transmission, the VoG sets an acceleration indication in the first data packet.

The acceleration indication is used to indicate the base station to perform accelerated transmission on data in the first data packet.

Specifically, the acceleration indication may be a "download acceleration" indication, which is not specifically limited in this embodiment of the present invention.

By using the acceleration indication, it may be recognized that the data packet is a data packet that needs accelerated transmission.

204. The VoG sends the first data packet to the base station.

Specifically, if the first data packet needs accelerated transmission, the first data packet sent to the base station carries the acceleration indication.

205. The base station receives the first data packet sent by the VoG.

206. The base station detects whether the first data packet carries the acceleration indication.

Specifically, if the first data packet does not carry the acceleration indication, step 207 is performed; or if the first data packet carries the acceleration indication, step 209 is performed.

207. If the first data packet does not carry the acceleration indication, the base station determines not to perform accelerated transmission on the data in the first data packet.

208. The base station uses a first manner to buffer the first data packet.

Specifically, in the prior art, after receiving a data packet that belongs to a specific bearer, the apparatus starts a packet discard timer of a fixed time length for the received data packet, and buffers the data packet. In this embodiment of the present invention, different manners are used to buffer data packets that need accelerated transmission and those that do not need accelerated transmission.

If it is determined not to perform accelerated transmission on the data in the first data packet, the first manner is used to buffer the first data packet, and the process of using the first manner to buffer the first data packet may specifically be:

starting a packet discard timer of a first time length for the first data packet, and buffering the first data packet.

It should be noted that, in the prior art, buffer management time defined by a packet discard timer of a fixed time length is typically at a granularity of milliseconds, and this buffer management manner is suitable for a data packet that is transmitted in a common manner. Therefore, if it is determined not to perform accelerated transmission on the data in the first data packet and the practice of using the first manner to buffer the first data packet is specifically to start the packet discard timer of the first time length for the first data packet and buffer the first data packet, the first time length may be determined according to the prior art.

209. If the first data packet carries the acceleration indication, the base station determines to perform accelerated transmission on the data in the first data packet.

210. The base station uses a second manner to buffer the first data packet, where a buffer duration in the second manner is greater than a buffer duration in the first manner.

Specifically, in this embodiment of the present invention, different manners are used to buffer data packets that need accelerated transmission and those that do not need accelerated transmission.

If it is determined to perform accelerated transmission on the data in the first data packet, the second manner is used to buffer the first data packet, and the process of using the second manner to buffer the first data packet may specifically be:

starting a packet discard timer of a second time length for the first data packet, and buffering the first data packet, where the second time length is greater than the first time length, and may specifically be infinite;

or buffering the first data packet without starting a packet discard timer.

It should be noted that buffer management time defined by a packet discard timer of a fixed time length in the prior art is typically at a granularity of milliseconds, and this buffer management manner is unsuitable for a data packet that needs accelerated transmission. This is because if accelerated transmission is required, a large quantity of data packets may be transmitted in the acceleration process, causing temporary bottleneck in scheduling and increasing a delay in data packet transmission. In the event that the packet discard timer of the fixed length is applied, the data packet that needs accelerated transmission may already be discarded due to timeout before being successfully transmitted to a user equipment. Therefore, if the practice of using the second manner to buffer the first data packet is specifically to start the packet discard timer of the second time length for the first data packet and buffer the first data packet, the second time length needs to be greater than the first time length, and the second time length should be long enough for the data packet that needs accelerated transmission. In which case, the apparatus discards the data packet that needs accelerated transmission only after receiving an acknowledgement message fed back by a receiver or an underlying layer to indicate successful receipt by the receiver. Specifically, if the second time length is infinite, the second time length is undoubtedly suitable for the data packet that needs accelerated transmission.

Apparently, the practice of not starting a packet discard timer may cause the data packet that needs accelerated transmission to be stored in a buffer all the time. The apparatus discards the data packet that needs accelerated transmission only after receiving an acknowledgement message fed back by a receiver or an underlying layer to indicate successful receipt by the receiver. Therefore, the practice of not starting a packet discard timer is also suitable for the data packet that needs accelerated transmission.

In addition to the method of controlling the discard timer, another buffer control technology may be used for the data packet that needs accelerated transmission, providing that the data packet that needs accelerated transmission is allowed to be stored in a buffer for a longer time, so as to avoid unnecessary data discard.

This embodiment of the present invention merely describes that the second manner is in use to buffer the data packet that needs accelerated transmission, where the buffer duration in the second manner is greater than the buffer duration in the first manner. No specific limitation is imposed on specific implementation of the second manner.

211. The base station schedules the first data packet to the user equipment.

Figure 3:
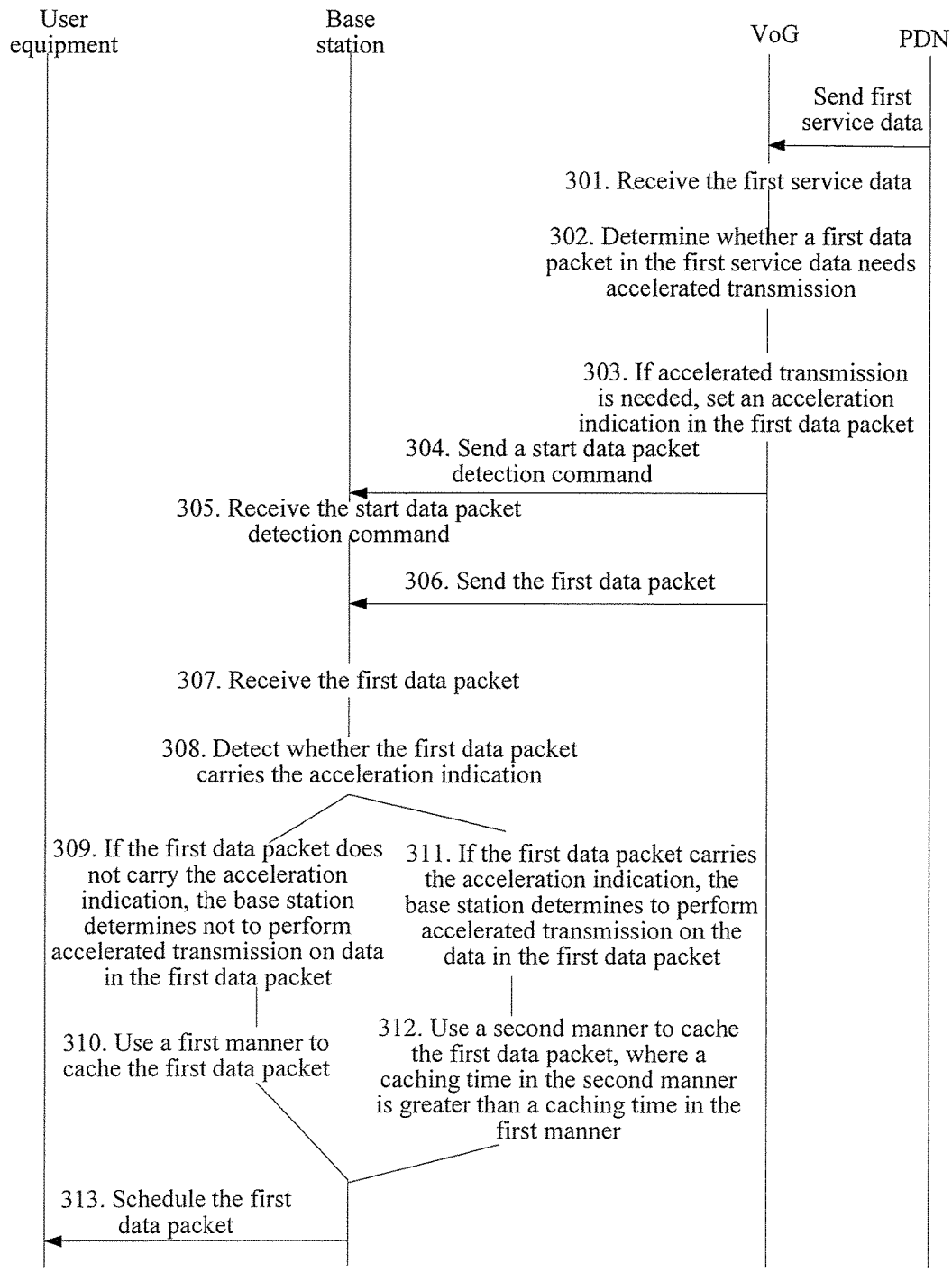
FIG. 3 illustrates another method for buffering data by a base station according to an embodiment of the present invention.

Optionally, this embodiment of the present invention further provides a method for buffering data. Specifically, an entire process of data packet forwarding in a video service is used as an example to describe data buffering at a base station. Specifically, as shown in FIG. 3, the method includes the following steps:

301. A VoG (video optimization gateway) receives first service data sent by a PDN (packet data network).

302. The VoG determines whether a first data packet in the first service data needs accelerated transmission.

Specifically, the first service data received by the VoG includes multiple data packets. Data in some data packets may be in a time range in which accelerated transmission is needed, whereas data in some data packets does not need accelerated transmission. For example, in an initial phase of playing an on-demand video to a user, to reduce an initial wait time for the user, the VoG may perform accelerated transmission on data in the initial phase of the video playback; or, when the user accesses a random segment of the video, to reduce a wait time for the user, the VoG may perform acceleration on data in the random video segment that the user accesses. In this case, the VoG may recognize, by taking advantage of a packet detection mechanism, a data packet that needs acceleration, that is to say, the VoG determines whether the first data packet in the first service data needs accelerated transmission.

303. If the first data packet needs accelerated transmission, the VoG sets an acceleration indication in the first data packet.

The acceleration indication is used to indicate the base station to perform accelerated transmission on data in the first data packet.

Specifically, the acceleration indication may be a "download acceleration" indication, which is not specifically limited in this embodiment of the present invention.

By using the acceleration indication, it may be recognized that the data packet is a data packet that needs accelerated transmission.

304. The VoG sends a start data packet detection command to the base station, where the start data packet detection command is used to instruct the base station to detect whether a data packet carries the acceleration indication.

Specifically, to reduce overhead due to data packet detection by the base station and prevent the base station from continuously performing acceleration indication detection for data packets, after the VoG determines to perform accelerated transmission on the first data packet sent to the base station, the VoG sends the start data packet detection command to the base station, notifying the base station to detect whether a data packet carries an acceleration indication.

305. The base station receives the start data packet detection command sent by the VoG.

306. The VoG sends the first data packet to the base station.

Specifically, if the first data packet needs accelerated transmission, the first data packet sent to the base station carries the acceleration indication.

It should be noted that, there is no specific sequence between step 305 performed by the base station and step 306 performed by the VoG, and the only requirement is that step 305 be performed after step 304 and step 306 be performed before step 307.

307. The base station receives the first data packet sent by the VoG.

308. The base station detects whether the first data packet carries the acceleration indication.

Specifically, if the first data packet does not carry the acceleration indication, step 309 is performed; or if the first data packet carries the acceleration indication, step 311 is performed.

309. If the first data packet does not carry the acceleration indication, the base station determines not to perform accelerated transmission on the data in the first data packet.

310. The base station uses a first manner to buffer the first data packet.

Specifically, in the prior art, after receiving a data packet that belongs to a specific bearer, the apparatus starts a packet discard timer of a fixed time length for the received data packet, and buffers the data packet. In this embodiment of the present invention, different manners are used to buffer data packets that need accelerated transmission and those that do not need accelerated transmission.

If it is determined not to perform accelerated transmission on the data in the first data packet, the first manner is used to buffer the first data packet, and the process of using the first manner to buffer the first data packet may specifically be:

starting a packet discard timer of a first time length for the first data packet, and buffering the first data packet.

It should be noted that, in the prior art, buffer management time defined by a packet discard timer of a fixed time length is typically at a granularity of milliseconds, and this buffer management manner is suitable for a data packet that is transmitted in a common manner. Therefore, if it is determined not to perform accelerated transmission on the data in the first data packet and the practice of using the first manner to buffer the first data packet is specifically to start the packet discard timer of the first time length for the first data packet and buffer the first data packet, the first time length may be determined according to the prior art.

311. If the first data packet carries the acceleration indication, the base station determines to perform accelerated transmission on the data in the first data packet.

312. The base station uses a second manner to buffer the first data packet, where a buffer duration in the second manner is greater than a buffer duration in the first manner.

Specifically, in this embodiment of the present invention, different manners are used to buffer data packets that need accelerated transmission and those that do not need accelerated transmission.

If it is determined to perform accelerated transmission on the data in the first data packet, the second manner is used to buffer the first data packet, and the process of using the second manner to buffer the first data packet may specifically be:

starting a packet discard timer of a second time length for the first data packet, and buffering the first data packet, where the second time length is greater than the first time length, and may specifically be infinite;

or buffering the first data packet without starting a packet discard timer.

It should be noted that buffer management time defined by a packet discard timer of a fixed time length in the prior art is typically at a granularity of milliseconds, and this buffer management manner is unsuitable for a data packet that needs accelerated transmission. This is because if accelerated transmission is required, a large quantity of data packets may be transmitted in the acceleration process, causing temporary bottleneck in scheduling and increasing a delay in data packet transmission. In the event that the packet discard timer of the fixed length is applied, the data packet that needs accelerated transmission may already be discarded due to timeout before being successfully transmitted to a user equipment. Therefore, if the practice of using the second manner to buffer the first data packet is specifically to start the packet discard timer of the second time length for the first data packet and buffer the first data packet, the second time length needs to be greater than the first time length, and the second time length should be long enough for the data packet that needs accelerated transmission. In which case, the apparatus discards the data packet that needs accelerated transmission only after receiving an acknowledgement message fed back by a receiver or an underlying layer to indicate successful receipt by the receiver. Specifically, if the second time length is infinite, the second time length is undoubtedly suitable for the data packet that needs accelerated transmission.

Apparently, the practice of not starting a packet discard timer may cause the data packet that needs accelerated transmission to be stored in a buffer all the time. The apparatus discards the data packet that needs accelerated transmission only after receiving an acknowledgement message fed back by a receiver or an underlying layer to indicate successful receipt by the receiver. Therefore, the practice of not starting a packet discard timer is also suitable for the data packet that needs accelerated transmission.

In addition to the method of controlling the discard timer, another buffer control technology may be used for the data packet that needs accelerated transmission, providing that the data packet that needs accelerated transmission is allowed to be stored in a buffer for a longer time, so as to avoid unnecessary data discard.

This embodiment of the present invention merely describes that the second manner is in use to buffer the data packet that needs accelerated transmission, where the buffer duration in the second manner is greater than the buffer duration in the first manner. No specific limitation is imposed on specific implementation of the second manner.

313. The base station schedules the first data packet to the user equipment.

Further, to further reduce overhead due to data packet detection by the base station, after the VoG sends the start data packet detection command to the base station, the VoG further determines whether a second data packet in the first service data needs accelerated transmission.

If the second data packet does not need accelerated transmission, the VoG sends a stop data packet detection command to the base station, where the stop data packet detection command is used to instruct the base station to stop detecting whether a data packet carries the acceleration indication.

Correspondingly, in this case, the method for buffering data by the base station further includes:

receiving, by the base station, the stop data packet detection command sent by the VoG so that the base station stops acceleration indication detection for data packets.

Figure 4:
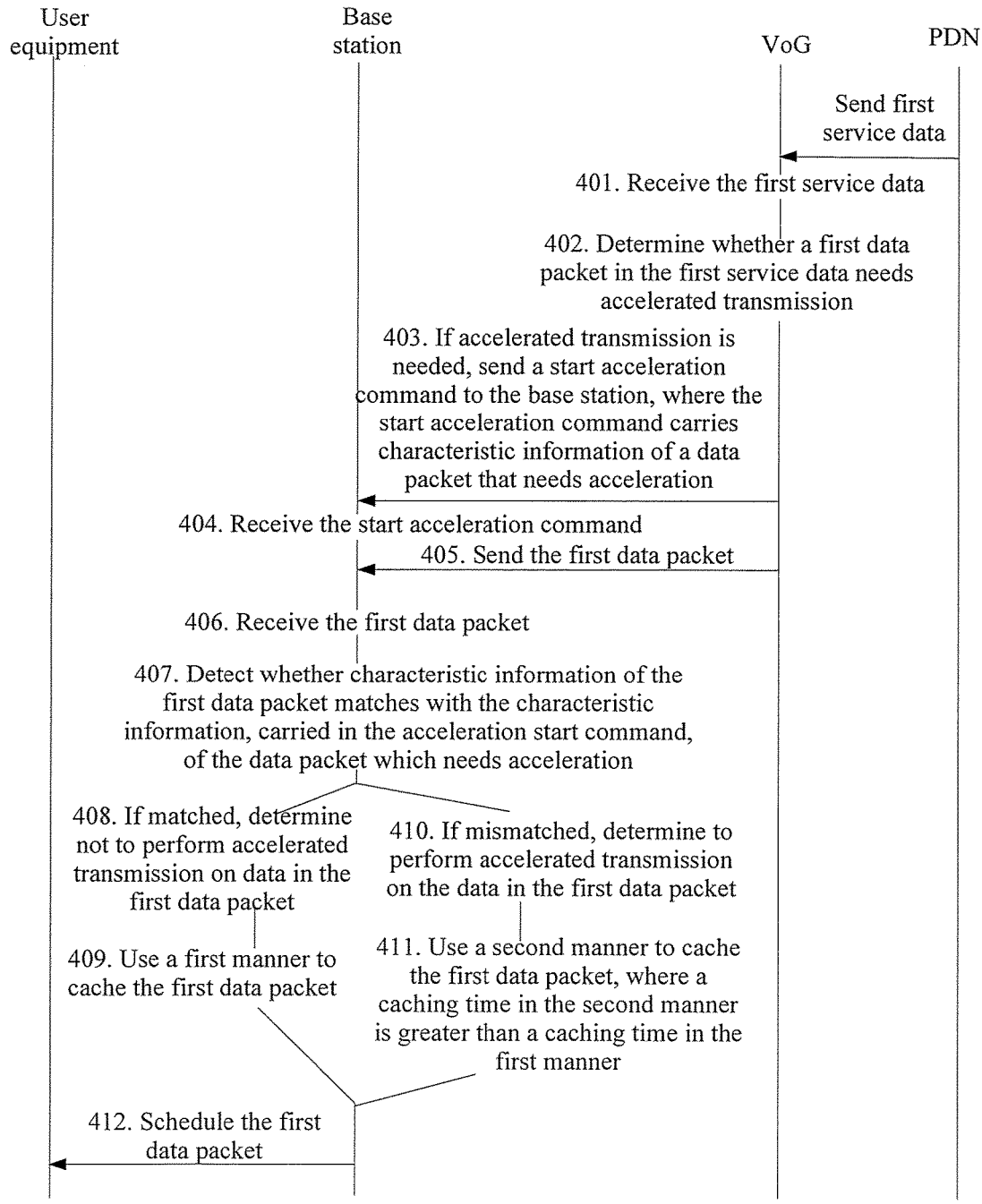
FIG. 4 illustrates still another method for buffering data by a base station according to an embodiment of the present invention.

Optionally, this embodiment of the present invention further provides a method for buffering data. Specifically, an entire process of data packet forwarding in a video service is used as an example to describe data buffering at a base station. Specifically, as shown in FIG. 4, the method includes the following steps:

401. A VoG (video optimization gateway) receives first service data sent by a PDN (packet data network).

402. The VoG determines whether a first data packet in the first service data needs accelerated transmission.

Specifically, the first service data received by the VoG includes multiple data packets. Data in some data packets may be in a time range in which accelerated transmission is needed, whereas data in some data packets does not need accelerated transmission. For example, in an initial phase of playing an on-demand video to a user, to reduce an initial wait time for the user, the VoG may perform accelerated transmission on data in the initial phase of the video playback; or, when the user accesses a random segment of the video, to reduce a wait time for the user, the VoG may perform acceleration on data in the random video segment that the user accesses. In this case, the VoG may recognize, by taking advantage of a packet detection mechanism, a data packet that needs acceleration, that is to say, the VoG determines whether the first data packet in the first service data needs accelerated transmission.

403. If the first data packet needs accelerated transmission, the VoG sends a start acceleration command to the base station.

The start acceleration command carries characteristic information of a data packet that needs acceleration.

Exemplarily, the characteristic information may specifically be an IP 5-tuple, namely, a source IP address, a destination IP address, a source port number, a destination port number, and a protocol type.

Apparently, the characteristic information may be other information that can identify the first data packet, and this embodiment of the present invention does not impose specific limitations on the characteristic information.

Specifically, the base station recognizes, according to the start acceleration command, the data packet that needs accelerated transmission.

404. The base station receives the start acceleration command sent by the VoG.

405. The VoG sends the first data packet to the base station.

It should be noted that, there is no specific sequence between step 405 performed by the VoG and step 404 performed by the base station, and the only requirement is that step 404 be performed after step 403 and step 405 be performed before step 406.

406. The base station receives the first data packet sent by the VoG.

407. The base station detects whether characteristic information of the first data packet matches with the characteristic information, carried in the start acceleration command, of the data packet that needs acceleration.

Specifically, if the characteristic information of the first data packet does not match with the characteristic information, carried in the start acceleration command, of the data packet that needs acceleration, step 408 is performed; or if the characteristic information of the first data packet matches with the characteristic information, carried in the start acceleration command, of the data packet that needs acceleration, step 410 is performed.

408. If the characteristic information of the first data packet does not match with the characteristic information, carried in the start acceleration command, of the data packet that needs acceleration, determine not to perform accelerated transmission on the data in the first data packet.

409. The base station uses a first manner to buffer the first data packet.

Specifically, in the prior art, after receiving a data packet that belongs to a specific bearer, the apparatus starts a packet discard timer of a fixed time length for the received data packet, and buffers the data packet. In this embodiment of the present invention, different manners are used to buffer data packets that need accelerated transmission and those that do not need accelerated transmission.

If it is determined not to perform accelerated transmission on the data in the first data packet, the first manner is used to buffer the first data packet, and the process of using the first manner to buffer the first data packet may specifically be:

starting a packet discard timer of a first time length for the first data packet, and buffering the first data packet.

It should be noted that, in the prior art, buffer management time defined by a packet discard timer of a fixed time length is typically at a granularity of milliseconds, and this buffer management manner is suitable for a data packet that is transmitted in a common manner. Therefore, if it is determined not to perform accelerated transmission on the data in the first data packet and the practice of using the first manner to buffer the first data packet is specifically to start the packet discard timer of the first time length for the first data packet and buffer the first data packet, the first time length may be determined according to the prior art.

410. If the characteristic information of the first data packet matches with the characteristic information, carried in the start acceleration command, of the data packet that needs acceleration, determine to perform accelerated transmission on the data in the first data packet.

411. The base station uses a second manner to buffer the first data packet, where a buffer duration in the second manner is greater than a buffer duration in the first manner.

Specifically, in this embodiment of the present invention, different manners are used to buffer data packets that need accelerated transmission and those that do not need accelerated transmission.

If it is determined to perform accelerated transmission on the data in the first data packet, the second manner is used to buffer the first data packet, and the process of using the second manner to buffer the first data packet may specifically be:

starting a packet discard timer of a second time length for the first data packet, and buffering the first data packet, where the second time length is greater than the first time length, and may specifically be infinite;

or buffering the first data packet without starting a packet discard timer.

It should be noted that buffer management time defined by a packet discard timer of a fixed time length in the prior art is typically at a granularity of milliseconds, and this buffer management manner is unsuitable for a data packet that needs accelerated transmission. This is because if accelerated transmission is required, a large quantity of data packets may be transmitted in the acceleration process, causing temporary bottleneck in scheduling and increasing a delay in data packet transmission. In the event that the packet discard timer of the fixed length is applied, the data packet that needs accelerated transmission may already be discarded due to timeout before being successfully transmitted to a user equipment. Therefore, if the practice of using the second manner to buffer the first data packet is specifically to start the packet discard timer of the second time length for the first data packet and buffer the first data packet, the second time length needs to be greater than the first time length, and the second time length should be long enough for the data packet that needs accelerated transmission. In which case, the apparatus discards the data packet that needs accelerated transmission only after receiving an acknowledgement message fed back by a receiver or an underlying layer to indicate successful receipt by the receiver. Specifically, if the second time length is infinite, the second time length is undoubtedly suitable for the data packet that needs accelerated transmission.

Apparently, the practice of not starting a packet discard timer may cause the data packet that needs accelerated transmission to be stored in a buffer all the time. The apparatus discards the data packet that needs accelerated transmission only after receiving an acknowledgement message fed back by a receiver or an underlying layer to indicate successful receipt by the receiver. Therefore, the practice of not starting a packet discard timer is also suitable for the data packet that needs accelerated transmission.

In addition to the method of controlling the discard timer, another buffer control technology may be used for the data packet that needs accelerated transmission, providing that the data packet that needs accelerated transmission is allowed to be stored in a buffer for a longer time, so as to avoid unnecessary data discard.

412. The base station schedules the first data packet to the user equipment.

Further, after the VoG sends the start acceleration command to the base station, the VoG further determines whether a third data packet in the first service needs accelerated transmission.

If the third data packet does not need accelerated transmission, the VoG sends a stop acceleration command to the base station, where the stop acceleration command instructs the base station to stop processing of accelerated transmission after the stop acceleration command is received, and the stop acceleration command carries characteristic information of a data packet for which accelerated transmission needs to be stopped.

Correspondingly, the method for buffering data by the base station further includes:

receiving the stop acceleration command, where the stop acceleration command carries characteristic information of the data packet for which accelerated transmission needs to be stopped.

Figure 5:
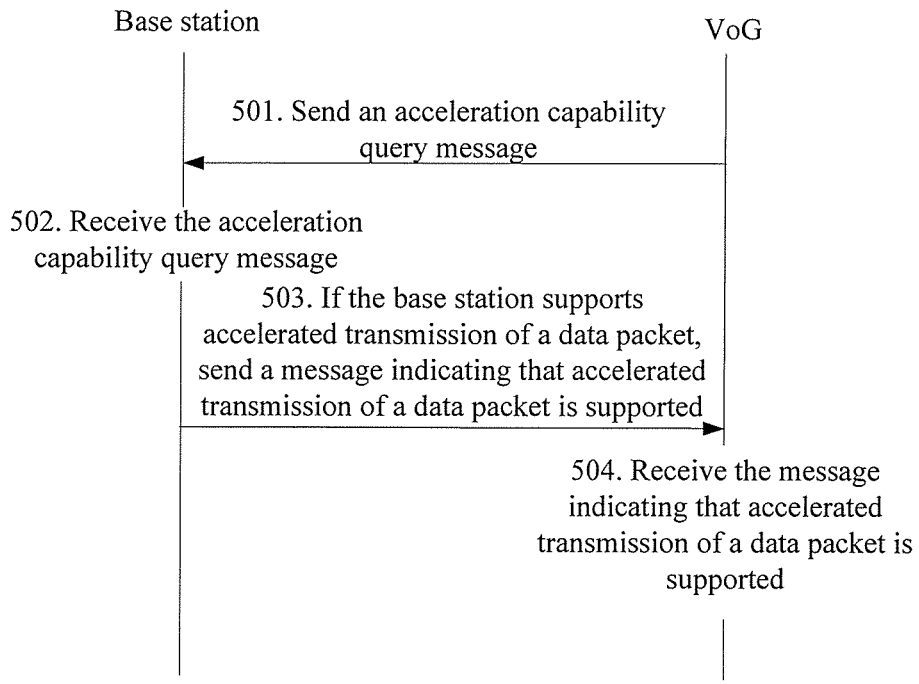
FIG. 5 is a diagram of function negotiation interaction between a video optimization gateway and a base station according to an embodiment of the present invention.

Further, referring again to the video service example, in a scenario of data buffering at the base station, a function negotiation process between the video optimization gateway and the base station is further involved. Specifically, as shown in FIG. 5, this process includes the following steps:

501. The VoG sends an acceleration capability query message, where the acceleration capability query message is used to query whether the base station supports accelerated transmission of a data packet.

502. The base station receives the acceleration capability query message.

503. If the base station supports accelerated transmission of a data packet, the base station sends a message indicating that accelerated transmission of a data packet is supported.

504. The VoG receives the message that is sent by the base station and indicates that accelerated transmission of a data packet is supported.

It should be noted that, if the base station does not support accelerated transmission of a data packet, the method for buffering data by the base station according to this embodiment of the present invention cannot be applied. In this embodiment of the present invention, the method for buffering data by the base station is applicable to a scenario in which the base station supports accelerated transmission of a data packet. By using the function negotiation process to query acceleration capability, it may be determined whether to use the method for buffering data by the base station.

Optionally, when the VoG establishes an interface with the base station, if the base station supports accelerated transmission of a data packet, the base station sends a message indicating that accelerated transmission of a data packet is supported.

Likewise, it should be noted that, when the VoG establishes an interface with the base station, if the base station does not support accelerated transmission of a data packet, the method for buffering data by the base station according to this embodiment of the present invention cannot be applied.

It should be noted that this embodiment of the present invention uses a video service as a specific example to describe the method for buffering data by a base station. However, the method for buffering data by a base station is not only applicable to a video service but also applicable to other services, and this embodiment of the present invention is not intended to be exhaustive or limiting.

Figure 6:
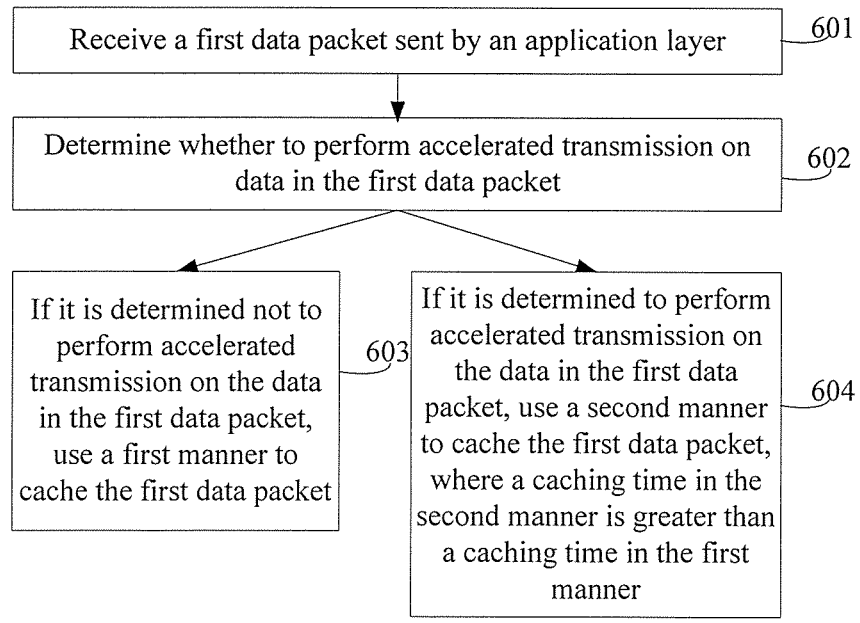
FIG. 6 illustrates a method for buffering data by a user equipment according to an embodiment of the present invention.

In addition, the foregoing description of the present invention is specifically directed to data buffering by a base station. However, the method for buffering data is not only applicable to data buffering by a base station but also applicable to other application scenarios. For example, the method is equally applicable to data buffering on a user equipment side. When the user equipment side buffers data, the first data packet may be from a base station. After the base station sends the first data packet to the user equipment, the first data packet is stored in the application layer of the user equipment. In view of this, if the user equipment side buffers data, the first data packet may be from the application layer of the user equipment. Specifically, as shown in FIG. 6, the method includes the following steps:

601. Receive a first data packet sent by the application layer.

602. Determine whether to perform accelerated transmission on data in the first data packet.

603. If it is determined not to perform accelerated transmission on the data in the first data packet, use a first manner to buffer the first data packet.

604. If it is determined to perform accelerated transmission on the data in the first data packet, use a second manner to buffer the first data packet, where a buffer duration in the second manner is greater than a buffer duration in the first manner.

Figure 7:
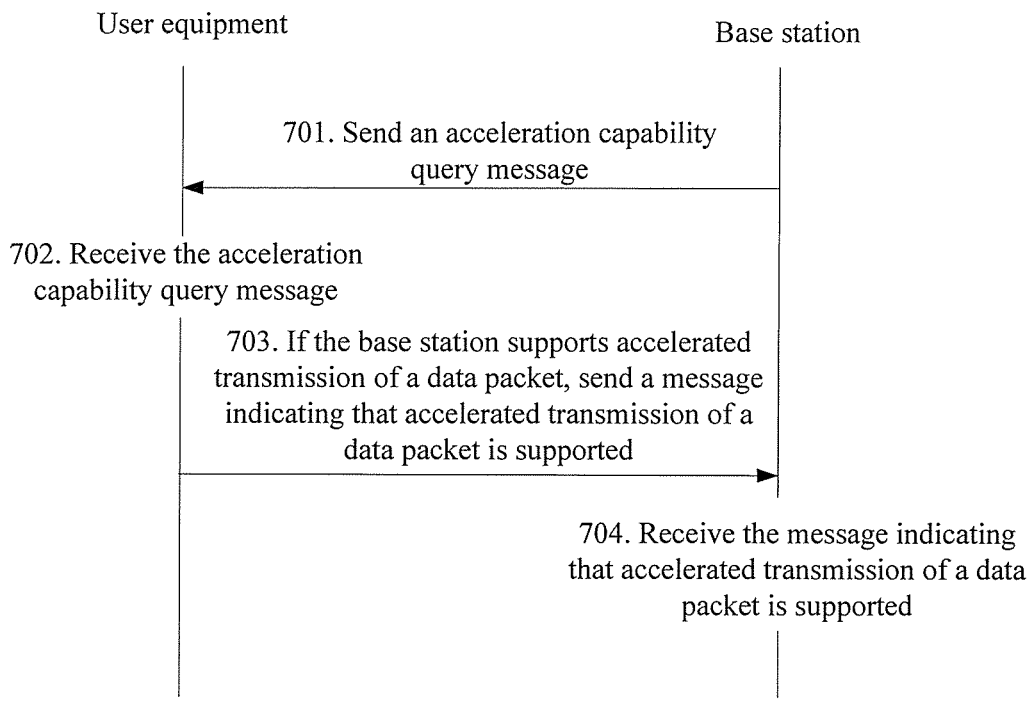
FIG. 7 is diagram of function negotiation interaction between a base station and a user equipment according to an embodiment of the present invention.

Further, similar to data buffering by the base station, the method for buffering data by a user equipment also involves a function negotiation process between the user equipment and the base station. Specifically, as shown in FIG. 7, this process includes the following steps:

701. The base station sends an acceleration capability query message, where the acceleration capability query message is used to query whether the user equipment supports accelerated transmission of a data packet.

702. The user equipment receives the acceleration capability query message.

703. If the user equipment supports accelerated transmission of a data packet, the user equipment sends a message indicating that accelerated transmission of a data packet is supported.

704. The base station receives the message that is sent by the user equipment and indicates that accelerated transmission of a data packet is supported.

Apparently, similar to the function negotiation process between the video optimization gateway and the base station in the scenario of data buffering by the base station, if the user equipment does not support accelerated transmission of a data packet, the method for buffering data by a user equipment side cannot be applied. The method for buffering data by a user equipment side is applicable to a scenario in which the user equipment supports accelerated transmission of a data packet. By using the function negotiation process to query acceleration capability, it may be determined whether to use the method for buffering data by the user equipment.

Optionally, when the user equipment establishes an interface with the base station, if the user equipment supports accelerated transmission of a data packet, the user equipment sends a message indicating that accelerated transmission of a data packet is supported.

It should be noted that the method for buffering data is not limited to data buffering on a base station side or a user equipment side, and the method may also be applied in other scenarios. Specifically, for methods of buffering data in other application scenarios, refer to the description in this embodiment. This embodiment of the present invention is not intended to be exhaustive or limiting.

This embodiment of the present invention provides a method for buffering data, where the method includes: receiving a first data packet, and determining whether to perform accelerated transmission on data in the first data packet; and if it is determined not to perform accelerated transmission on the data in the first data packet, using a first manner to buffer the first data packet; and if it is determined to perform accelerated transmission on the data in the first data packet, using a second manner to buffer the first data packet, where a buffer duration in the second manner is greater than a buffer duration in the first manner. In this method, different manners are used to buffer data packets that need accelerated transmission and those that do not need accelerated transmission, so that an apparatus can perform highly reliable buffering processing on a received first data packet, thereby improving user experience.

Embodiment 3

Figure 8:
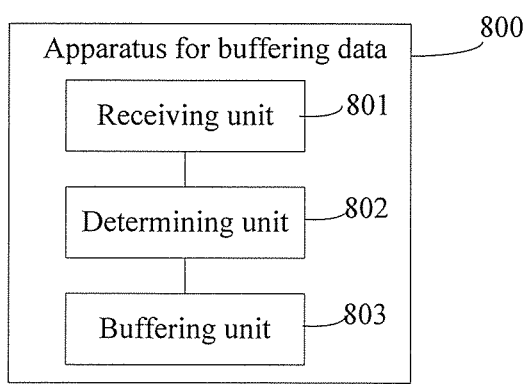
FIG. 8 depicts an apparatus for buffering data according to an embodiment of the present invention.

This embodiment of the present invention provides an apparatus 800 for buffering data. Specifically, as shown in FIG. 8, the apparatus 800 includes a receiving unit 801, a determining unit 802, and a buffering unit 803.

The receiving unit 801 is configured to receive a first data packet.

Specifically, the first data packet may be from a gateway, or may be from another network device. An apparatus that receives the first data packet may be a base station, or may be a UE. If the first data packet is received by a UE, the first data packet may be from a base station. After the base station sends the first data packet to the UE, the first data packet is stored in the application layer of the UE. In view of this, if the first data packet is received by a UE, the first data packet is from the application layer of the UE. This embodiment of the present invention does not impose specific limitations on source of the first data packet or on the application scope of the present invention, and merely describes that the receiving unit 801 receives the first data packet.

The determining unit 802 is configured to determine whether to perform accelerated transmission on data in the first data packet.

Specifically, after the receiving unit 801 receives the first data packet, the determining unit 802 needs to determine whether to perform accelerated transmission on the data in the first data packet. The determining may be performed as follows:

detecting whether the first data packet carries an acceleration indication, and if the first data packet carries the acceleration indication, it is determined to perform accelerated transmission on the data in the first data packet; or if the first data packet does not carry the acceleration indication, determining not to perform accelerated transmission on the data in the first data packet.

Alternatively, the determining may be performed as follows:

the receiving unit 801 receives a start acceleration command, where the start acceleration command carries characteristic information of a data packet that needs accelerated transmission, and then the determining unit 802 detects whether characteristic information of the first data packet matches with the characteristic information, carried in the start acceleration command, of the data packet that needs accelerated transmission; and if the characteristic information of the first data packet matches with the characteristic information, carried in the start acceleration command, of the data packet that needs acceleration, it is determined to perform accelerated transmission on the data in the first data packet; or if the characteristic information of the first data packet does not match with the characteristic information, carried in the start acceleration command, of the data packet that needs acceleration, it is determined not to perform accelerated transmission on the data in the first data packet.

Exemplarily, the characteristic information may specifically be an IP 5-tuple, namely, a source IP address, a destination IP address, a source port number, a destination port number, and a protocol type.

Apparently, the characteristic information may be other information that can identify the first data packet, and this embodiment of the present invention does not impose specific limitations on the characteristic information.

This embodiment of the present invention seeks to describe that, after receiving the first data packet, the apparatus 800 further determines whether to perform accelerated transmission on the data in the first data packet. No specific limitation is imposed on how to determine whether to perform accelerated transmission on the data in the first data packet.

The buffering unit 803 is configured to: if it is determined not to perform accelerated transmission on the data in the first data packet, use a first manner to buffer the first data packet.

Specifically, in the prior art, after receiving a data packet that belongs to a specific bearer, the apparatus 800 starts a packet discard timer of a fixed time length for the received data packet, and buffers the data packet. In this embodiment of the present invention, different manners are used to buffer data packets that need accelerated transmission and those that do not need accelerated transmission.

If it is determined not to perform accelerated transmission on the data in the first data packet, the buffering unit 803 uses the first manner to buffer the first data packet, and the process of using the first manner to buffer the first data packet may specifically be:

starting a packet discard timer of a first time length for the first data packet, and buffering the first data packet.

It should be noted that, in the prior art, buffer management time defined by a packet discard timer of a fixed time length is typically at a granularity of milliseconds, and this buffer management manner is suitable for a data packet that is transmitted in a common manner. Therefore, if it is determined not to perform accelerated transmission on the data in the first data packet and the practice of using the first manner to buffer the first data packet is specifically to start the packet discard timer of the first time length for the first data packet and buffer the first data packet, the first time length may be determined according to the prior art.

The buffering unit 803 is further configured to: if it is determined to perform accelerated transmission on the data in the first data packet, use a second manner to buffer the first data packet, where a buffer duration in the second manner is greater than a buffer duration in the first manner.

Specifically, in this embodiment of the present invention, different manners are used to buffer data packets that need accelerated transmission and those that do not need accelerated transmission.

If it is determined to perform accelerated transmission on the data in the first data packet, the buffering unit 803 uses the second manner to buffer the first data packet, and the process of using the second manner to buffer the first data packet may specifically be:

starting a packet discard timer of a second time length for the first data packet, and buffering the first data packet, where the second time length is greater than the first time length, and may specifically be infinite; or buffering the first data packet without starting a packet discard timer.

It should be noted that buffer management time defined by a packet discard timer of a fixed time length in the prior art is typically at a granularity of milliseconds, and this buffer management manner is unsuitable for a data packet that needs accelerated transmission. This is because if accelerated transmission is required, a large quantity of data packets may be transmitted in the acceleration process, causing temporary bottleneck in scheduling and increasing a delay in data packet transmission. In the event that the packet discard timer of the fixed length is applied, the data packet that needs accelerated transmission may already be discarded due to timeout before being successfully transmitted to a user equipment. Therefore, if the practice of using the second manner to buffer the first data packet is specifically to start the packet discard timer of the second time length for the first data packet and buffer the first data packet, the second time length needs to be greater than the first time length, and the second time length should be long enough for the data packet that needs accelerated transmission. In which case, the apparatus discards the data packet that needs accelerated transmission only after receiving an acknowledgement message fed back by a receiver or an underlying layer to indicate successful receipt by the receiver. Specifically, if the second time length is infinite, the second time length is undoubtedly suitable for the data packet that needs accelerated transmission.

Apparently, the practice of not starting a packet discard timer may cause the data packet that needs accelerated transmission to be stored in a buffer all the time. The apparatus discards the data packet that needs accelerated transmission only after receiving an acknowledgement message fed back by a receiver or an underlying layer to indicate successful receipt by the receiver. Therefore, the practice of not starting a packet discard timer is also suitable for the data packet that needs accelerated transmission.

In addition to the method of controlling the discard timer, another buffer control technology may be used for the data packet that needs accelerated transmission, providing that the data packet that needs accelerated transmission is allowed to be stored in a buffer for a longer time, so as to avoid unnecessary data discard.

This embodiment of the present invention merely describes that the second manner is in use to buffer the data packet that needs accelerated transmission, where the buffer duration in the second manner is greater than the buffer duration in the first manner. No specific limitation is imposed on specific implementation of the second manner.

Further, the determining, by the determining unit 802, whether to perform accelerated transmission on data in the first data packet specifically includes:

detecting whether the first data packet carries an acceleration indication; and if the first data packet carries the acceleration indication, determining to perform accelerated transmission on the data in the first data packet; or if the first data packet does not carry the acceleration indication, determining not to perform accelerated transmission on the data in the first data packet.

Further, to reduce overhead due to data packet detection by the apparatus 800 and prevent the apparatus 800 from continuously performing acceleration indication detection for data packets, after it is determined to perform accelerated transmission on the first data packet sent to the apparatus 800, a communication peer end further sends a start data packet detection command to the apparatus 800, notifying the apparatus 800 to start acceleration indication detection for data packets. Therefore, for the apparatus 800:

the receiving unit 801 is further configured to: before the detection on whether the first data packet carries an acceleration indication, receive a start data packet detection command, where the start data packet detection command is used to instruct to detect whether a data packet carries the acceleration indication.

Further, when the communication peer end determines not to perform accelerated transmission on the received data packet, to further reduce overhead due to data packet detection by the apparatus 800, the receiving unit 801 is further configured to: after receiving the start data packet detection command, receive a stop data packet detection command, where the stop data packet detection command is used to instruct to stop detection on whether a data packet carries the acceleration indication.

Optionally, the receiving unit 801 is further configured to: before receiving the first data packet, receive a start acceleration command, where the start acceleration command carries characteristic information of a data packet that needs acceleration.

Exemplarily, the characteristic information may specifically be an IP 5-tuple, namely, a source IP address, a destination IP address, a source port number, a destination port number, and a protocol type. This embodiment of the present invention does not impose specific limitations on the characteristic information.

Apparently, the characteristic information may be other information that can identify the first data packet, and this embodiment of the present invention does not impose specific limitations on the characteristic information.

Specifically, the apparatus 800 recognizes, according to the start acceleration command, the data packet that needs accelerated transmission.

The determining, by the determining unit 802, whether to perform accelerated transmission on data in the first data packet specifically includes:

detecting whether characteristic information of the first data packet matches with the characteristic information, carried in the start acceleration command, of the data packet that needs acceleration; and if the characteristic information of the first data packet matches with the characteristic information, carried in the start acceleration command, of the data packet that needs acceleration, it is determined to perform accelerated transmission on the data in the first data packet; or if the characteristic information of the first data packet does not match with the characteristic information, carried in the start acceleration command, of the data packet that needs acceleration, it is determined not to perform accelerated transmission on the data in the first data packet.

Further, the receiving unit 801 is further configured to: after receiving the start acceleration command, receive a stop acceleration command, where the stop acceleration command carries characteristic information of a data packet for which acceleration needs to be stopped.

The using, by the buffering unit 803, a first manner to buffer the first data packet specifically includes:

starting a packet discard timer of a first time length for the first data packet, and buffering the first data packet.

The using, by the buffering unit 803, a second manner to buffer the first data packet specifically includes:

starting a packet discard timer of a second time length for the first data packet, and buffering the first data packet, where the second time length is greater than the first time length.

Specifically, the second time length may be infinite.

Optionally, the using, by the buffering unit 803, a second manner to buffer the first data packet specifically includes:

buffering the first data packet without starting a packet discard timer.

Figure 9:
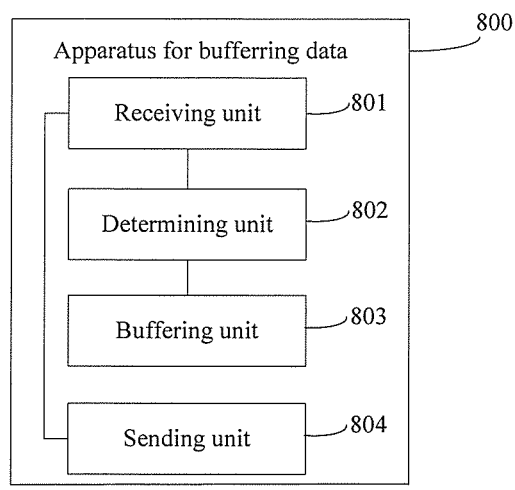
FIG. 9 depicts another apparatus for buffering data according to an embodiment of the present invention.

Optionally, as shown in FIG. 9, the apparatus 800 further includes a sending unit 804.

The receiving unit 801 is further configured to receive an acceleration capability query message, where the acceleration capability query message is used to query whether accelerated transmission of a data packet is supported; and the sending unit 804 is configured to: if accelerated transmission of a data packet is supported, send a message indicating that accelerated transmission of a data packet is supported.

It should be noted that, if the apparatus 800 does not support accelerated transmission of a data packet, the method for buffering data according to the embodiments of the present invention cannot be applied. The method for buffering data according to the embodiments is applicable to a scenario in which the apparatus 800 supports accelerated transmission of a data packet. By using a function negotiation process to perform acceleration capability query, it may be determined whether to use the method for buffering data.

Apparently, the apparatus 800 may not have to send a message indicating support for accelerated transmission of a data packet only after the acceleration capability query message is received; and the foregoing function negotiation process is merely one type of function negotiation process.

Optionally, the sending unit 804 is further configured to: if accelerated transmission of a data packet is supported, send during interface establishment a message indicating that accelerated transmission of a data packet is supported.

Specifically, for a method of buffering data by the data buffering apparatus, refer to the descriptions in Embodiment 1 and Embodiment 2, and details are not described herein again in this embodiment of the present invention.

Specifically, the apparatus for buffering data may be applied to data buffering at a base station, or may be applied to data buffering at a user equipment, and this embodiment of the present invention does not impose specific limitations on an application scenario of the apparatus for buffering data.

This embodiment of the present invention provides an apparatus for buffering data, where the apparatus includes a receiving unit, a determining unit, and a buffering unit. After the receiving unit receives a first data packet, the determining unit determines whether to perform accelerated transmission on data in the first data packet; and if it is determined not to perform accelerated transmission on the data in the first data packet, the buffering unit uses a first manner to buffer the first data packet; or if it is determined to perform accelerated transmission on the data in the first data packet, the buffering unit uses a second manner to buffer the first data packet, where a buffer duration in the second manner is greater than a buffer duration in the first manner. The apparatus uses different manners to buffer data packets that need accelerated transmission and those that do not need accelerated transmission, so that the apparatus can perform highly reliable buffering processing on a received first data packet, thereby improving user experience.

Embodiment 4

Figure 10:
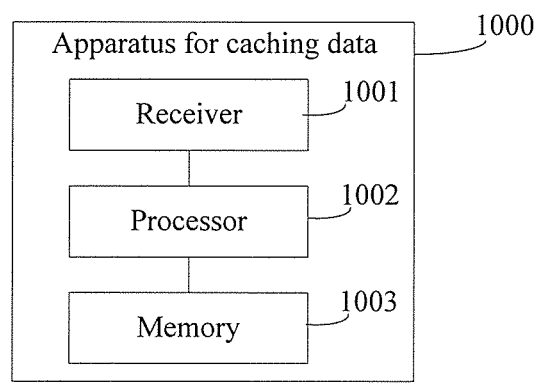
FIG. 10 depicts still another apparatus for buffering data according to an embodiment of the present invention.

An embodiment of the present invention provides an apparatus 1000 for buffering data. Specifically, as shown in FIG. 10, the apparatus 1000 includes a receiver 1001, a processor 1002, and a memory 1003.

The receiver 1001 is configured to receive a first data packet, and send the first data packet to the processor 1002.

Specifically, the first data packet may be from a gateway, or may be from another network device. An apparatus that receives the first data packet may be a base station, or may be a UE. If the first data packet is received by a UE, the first data packet may be from a base station. After the base station sends the first data packet to the UE, the first data packet is stored in the application layer of the UE. In view of this, if the first data packet is received by a UE, the first data packet is from the application layer of the UE. This embodiment of the present invention does not impose specific limitations on a source of the first data packet or on the application scope of the present invention, and merely describes that the receiver 1001 receives the first data packet, and sends the first data packet to the processor 1002.

The processor 1002 is configured to receive the first data packet sent by the receiver 1001, and determine whether to perform accelerated transmission on data in the first data packet.

Specifically, after the receiver 1001 sends the first data packet to the processor 1002, the processor 1002 receives the first data packet, and determines whether to perform accelerated transmission on the data in the first data packet.

The following manner may be used to determine whether to perform accelerated transmission on the data in the first data packet:

detecting whether the first data packet carries an acceleration indication, and if the first data packet carries the acceleration indication, it is determined to perform accelerated transmission on the data in the first data packet; or if the first data packet does not carry the acceleration indication, determining not to perform accelerated transmission on the data in the first data packet.

Alternatively, the following manner may be used to determine whether to perform accelerated transmission on the data in the first data packet:

the receiver 1001 receives a start acceleration command, where the start acceleration command carries characteristic information of a data packet that needs accelerated transmission, and then the processor 1002 detects whether characteristic information of the first data packet matches with the characteristic information, carried in the start acceleration command, of the data packet that needs acceleration; and if the characteristic information of the first data packet matches with the characteristic information, carried in the start acceleration command, of the data packet that needs acceleration, it is determined to perform accelerated transmission on the data in the first data packet; or if the characteristic information of the first data packet does not match with the characteristic information, carried in the start acceleration command, of the data packet that needs acceleration, it is determined not to perform accelerated transmission on the data in the first data packet.

Exemplarily, the characteristic information may specifically be an IP 5-tuple, namely, a source IP address, a destination IP address, a source port number, a destination port number, and a protocol type.

Apparently, the characteristic information may be other information that can identify the first data packet, and this embodiment of the present invention does not impose specific limitations on the characteristic information.

This embodiment of the present invention seeks to describe that, after receiving the first data packet, the apparatus 1000 further determines whether to perform accelerated transmission on the data in the first data packet. No specific limitation is imposed on how the processor 1002 determines whether to perform accelerated transmission on the data in the first data packet.

The memory 1003 is configured to: if it is determined not to perform accelerated transmission on the data in the first data packet, use a first manner to buffer the first data packet.

Specifically, in the prior art, after receiving a data packet that belongs to a specific bearer, the apparatus 1000 starts a packet discard timer of a fixed time length for the received data packet, and buffers the data packet. In this embodiment of the present invention, different manners are used to buffer data packets that need accelerated transmission and those that do not need accelerated transmission.

If it is determined not to perform accelerated transmission on the data in the first data packet, the memory 1003 uses the first manner to buffer the first data packet, and the process of using the first manner to buffer the first data packet may specifically be:

starting a packet discard timer of a first time length for the first data packet, and buffering the first data packet.

It should be noted that, in the prior art, buffer management time defined by a packet discard timer of a fixed time length is typically at a granularity of milliseconds, and this buffer management manner is suitable for a data packet that is transmitted in a common manner. Therefore, if it is determined not to perform accelerated transmission on the data in the first data packet and the practice of using the first manner to buffer the first data packet is specifically to start the packet discard timer of the first time length for the first data packet and buffer the first data packet, the first time length may be determined according to the prior art.

The memory 1003 is further configured to: if it is determined to perform accelerated transmission on the data in the first data packet, use a second manner to buffer the first data packet, where a buffer duration in the second manner is greater than a buffer duration in the first manner.

Specifically, in this embodiment of the present invention, different manners are used to buffer data packets that need accelerated transmission and those that do not need accelerated transmission.

If it is determined to perform accelerated transmission on the data in the first data packet, the memory 1003 uses the second manner to buffer the first data packet, and the process of using the second manner to buffer the first data packet may specifically be:

starting a packet discard timer of a second time length for the first data packet, and buffering the first data packet, where the second time length is greater than the first time length, and may specifically be infinite;

or buffering the first data packet without starting a packet discard timer.

It should be noted that buffer management time defined by a packet discard timer of a fixed time length in the prior art is typically at a granularity of milliseconds, and this buffer management manner is unsuitable for a data packet that needs accelerated transmission. This is because if accelerated transmission is required, a large quantity of data packets may be transmitted in the acceleration process, causing temporary bottleneck in scheduling and increasing a delay in data packet transmission. In the event that the packet discard timer of the fixed length is applied, the data packet that needs accelerated transmission may already be discarded due to timeout before being successfully transmitted to a user equipment. Therefore, if the practice of using the second manner to buffer the first data packet is specifically to start the packet discard timer of the second time length for the first data packet and buffer the first data packet, the second time length needs to be greater than the first time length, and the second time length should be long enough for the data packet that needs accelerated transmission. In which case, the apparatus discards the data packet that needs accelerated transmission only after receiving an acknowledgement message fed back by a receiver or an underlying layer to indicate successful receipt by the receiver. Specifically, if the second time length is infinite, the second time length is undoubtedly suitable for the data packet that needs accelerated transmission.

Apparently, the practice of not starting a packet discard timer may cause the data packet that needs accelerated transmission to be stored in a buffer all the time. The apparatus discards the data packet that needs accelerated transmission only after receiving an acknowledgement message fed back by a receiver or an underlying layer to indicate successful receipt by the receiver. Therefore, the practice of not starting a packet discard timer is also suitable for the data packet that needs accelerated transmission.

In addition to the method of controlling the discard timer, another buffer control technology may be used for the data packet that needs accelerated transmission, providing that the data packet that needs accelerated transmission is allowed to be stored in a buffer for a longer time, so as to avoid unnecessary data discard.

This embodiment of the present invention merely describes that the second manner is in use to buffer the data packet that needs accelerated transmission, where the buffer duration in the second manner is greater than the buffer duration in the first manner. No specific limitation is imposed on specific implementation of the second manner.

Further, the determining, by the processor 1002, whether to perform accelerated transmission on data in the first data packet specifically includes:

detecting whether the first data packet carries an acceleration indication; and if the first data packet carries the acceleration indication, determining to perform accelerated transmission on the data in the first data packet; or if the first data packet does not carry the acceleration indication, determining not to perform accelerated transmission on the data in the first data packet.

Further, to reduce overhead due to data packet detection by the apparatus 1000 and prevent the apparatus 1000 from continuously performing acceleration indication detection for data packets, after it is determined to perform accelerated transmission on the first data packet sent to the apparatus 1000, a communication peer end further sends a start data packet detection command to the apparatus 1000, notifying the apparatus 1000 to start acceleration indication detection for data packets. Therefore, for the apparatus 1000:

the receiver 1001 is further configured to: before the processor detects whether the first data packet carries the acceleration indication, receive a start data packet detection command, and send the start data packet detection command to the processor 1002, where the start data packet detection command is used to instruct to detect whether a data packet carries the acceleration indication.

Further, when the communication peer end determines not to perform accelerated transmission on the received data packet, to further reduce overhead due to data packet detection by the apparatus 1000, the receiver 1001 is further configured to: after receiving the start data packet detection command, receive a stop data packet detection command, where the stop data packet detection command is used to instruct to stop detection on whether a data packet carries the acceleration indication.

Optionally, the receiver 1001 is further configured to: before receiving the first data packet, receive a start acceleration command, where the start acceleration command carries characteristic information of a data packet that needs acceleration.

Exemplarily, the characteristic information may specifically be an IP 5-tuple, namely, a source IP address, a destination IP address, a source port number, a destination port number, and a protocol type.

Apparently, the characteristic information may be other information that can identify the first data packet, and this embodiment of the present invention does not impose specific limitations on the characteristic information.

Specifically, the apparatus 1000 recognizes, according to the start acceleration command, the data packet that needs accelerated transmission.

The determining, by the processor 1002, whether to perform accelerated transmission on data in the first data packet specifically includes:

detecting whether characteristic information of the first data packet matches with the characteristic information, carried in the start acceleration command, of the data packet that needs acceleration; and if the characteristic information of the first data packet matches with the characteristic information, carried in the start acceleration command, of the data packet that needs acceleration, determining to perform accelerated transmission on the data in the first data packet; or if the characteristic information of the first data packet does not match with the characteristic information, carried in the start acceleration command, of the data packet that needs acceleration, determining not to perform accelerated transmission on the data in the first data packet.

Further, the receiving unit 1001 is further configured to: after receiving the start acceleration command, receive a stop acceleration command, where the stop acceleration command carries characteristic information of a data packet for which acceleration needs to be stopped.

Further, the using, by the memory 1003, a first manner to buffer the first data packet specifically includes:

starting a packet discard timer of a first time length for the first data packet, and buffering the first data packet.

The using, by the memory 1003, a second manner to buffer the first data packet specifically includes:

starting a packet discard timer of a second time length for the first data packet, and buffering the first data packet, where the second time length is greater than the first time length.

Specifically, the second time length may be infinite.

Optionally, the using, by the memory 1003, a second manner to buffer the first data packet specifically includes:

buffering the first data packet without starting a packet discard timer.

Figure 11:
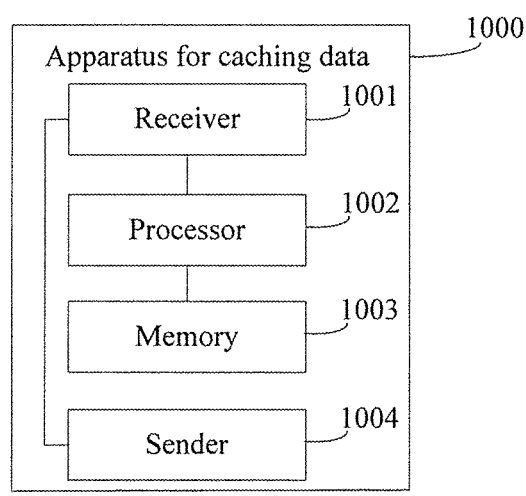
FIG. 11 depicts yet another apparatus for buffering data according to an embodiment of the present invention.

Optionally, specifically, as shown in FIG. 11, the apparatus 1000 further includes a sender 1004.

The receiver 1001 is configured to receive an acceleration capability query message, where the acceleration capability query message is used to query whether accelerated transmission of a data packet is supported; and the sender 1004 is configured to: if accelerated transmission of a data packet is supported, send a message indicating that accelerated transmission of a data packet is supported.

It should be noted that, if the apparatus 1000 does not support accelerated transmission of a data packet, the method for buffering data according to the embodiments of the present invention cannot be applied. The method for buffering data according to the embodiments is applicable to a scenario in which the apparatus 1000 supports accelerated transmission of a data packet. By using a function negotiation process to perform acceleration capability query, it may be determined whether to use the method for buffering data.

Apparently, the apparatus 1000 may not have to send a message indicating support for accelerated transmission of a data packet only after the acceleration capability query message is received; and the foregoing function negotiation process is merely one type of function negotiation process.

Optionally, the sender 1004 is further configured to: if accelerated transmission of a data packet is supported, send during interface establishment a message indicating that accelerated transmission of a data packet is supported.

Specifically, for a method of buffering data by the data buffering apparatus, refer to the descriptions in Embodiment 1 and Embodiment 2, and details are not described herein again in this embodiment of the present invention.

Specifically, the apparatus for buffering data may be applied to data buffering at a base station, or may be applied to data buffering at a user equipment, and this embodiment of the present invention does not impose specific limitations on an application scenario of the apparatus for buffering data.

This embodiment of the present invention provides an apparatus for buffering data, where the apparatus includes a receiver, a processor, and a memory. After the receiver receives a first data packet, the processor determines whether to perform accelerated transmission on data in the first data packet; and if it is determined not to perform accelerated transmission on the data in the first data packet, the memory uses a first manner to buffer the first data packet; and if it is determined to perform accelerated transmission on the data in the first data packet, the memory uses a second manner to buffer the first data packet, where a buffer duration in the second manner is greater than a buffer duration in the first manner. The apparatus uses different manners to buffer data packets that need accelerated transmission and those that do not need accelerated transmission, so that the apparatus can perform highly reliable buffering processing on a received first data packet, thereby improving user experience.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for buffering data, the apparatus comprising:
   a receiver configured to receive a first data packet;
   a processor configured to receive the first data packet from the receiver, and determine whether to perform accelerated transmission on data in the first data packet;
   a memory configured to:
      if it is determined not to perform accelerated transmission on the data in the first data packet, start a packet discard timer of a first time length for the first data packet, and buffer the first data packet; and
      if it is determined to perform accelerated transmission on the data in the first data packet, start a packet discard timer of a second time length for the first data packet, and buffer the first data packet, wherein the second time length is greater than the first time length.

2. The apparatus according to claim 1, wherein the processor is further configured to:
   detect whether the first data packet carries an acceleration indication; and
   if the first data packet carries the acceleration indication, determine to perform accelerated transmission on the data in the first data packet; or
   if the first data packet does not carry the acceleration indication, determine not to perform accelerated transmission on the data in the first data packet.

3. The apparatus according to claim 2, wherein the receiver is further configured to:
   before the processor detects whether the first data packet carries the acceleration indication, receive a start data packet detection command, and send the start data packet detection command to the processor, wherein the start data packet detection command is used to instruct to detect whether a data packet carries the acceleration indication.

4. The apparatus according to claim 3, wherein the receiver is further configured to:
   after receiving the start data packet detection command, receive a stop data packet detection command, wherein the stop data packet detection command is used to instruct to stop detection on whether a data packet carries the acceleration indication.

5. The apparatus according to claim 1, wherein:
   the receiver is further configured to:
      before receiving the first data packet, receive a start acceleration command, wherein the start acceleration command carries characteristic information of a data packet that needs acceleration; and
   in the event of determining whether to perform accelerated transmission on data in the first data packet, the processor is configured to:
      detect whether characteristic information of the first data packet matches with the characteristic information, carried in the start acceleration command, of the data packet that needs acceleration, and
      if the characteristic information of the first data packet matches with the characteristic information, carried in the start acceleration command, of the data packet that needs acceleration, determine to perform accelerated transmission on the data in the first data packet, or if the characteristic information of the first data packet does not match with the characteristic information, carried in the start acceleration command, of the data packet that needs acceleration, determine not to perform accelerated transmission on the data in the first data packet.

6. The apparatus according to claim 5, wherein the receiver is further configured to:

after receiving the start acceleration command, receive a stop acceleration command, wherein the stop acceleration command carries characteristic information of a data packet for which acceleration needs to be stopped.

7. The apparatus according to claim 1, wherein the apparatus further comprises:

a sender configured to:
if accelerated transmission of a data packet is supported, send in an interface establishment process a message indicating that accelerated transmission of a data packet is supported; or the receiver is configured to:
receive an acceleration capability query message, wherein the acceleration capability query message is used to query whether accelerated transmission of a data packet is supported, and the sender is configured to: if accelerated transmission of a data packet is supported, send a message indicating that accelerated transmission of a data packet is supported.

8. A method for buffering data, the method comprising:
receiving a first data packet;
determining whether to perform accelerated transmission on data in the first data packet;
if it is determined not to perform accelerated transmission on the data in the first data packet, starting a packet discard timer of a first time length for the first data packet, and buffering the first data packet; and
if it is determined to perform accelerated transmission on the data in the first data packet, starting a packet discard timer of a second time length for the first data packet, and buffering the first data packet, wherein the second time length is greater than the first time length.

9. The method according to claim 8, wherein before receiving the first data packet, the method further comprises:
receiving a start acceleration command, wherein the start acceleration command carries characteristic information of a data packet that needs acceleration; and
determining whether to perform accelerated transmission on data in the first data packet comprises:
detecting whether characteristic information of the first data packet matches with the characteristic information, carried in the start acceleration command, of the data packet that needs acceleration, and
if the characteristic information of the first data packet matches with the characteristic information, carried in the start acceleration command, of the data packet that needs acceleration, determining to perform accelerated transmission on the data in the first data packet, or if the characteristic information of the first data packet does not match with the characteristic information, carried in the start acceleration command, of the data packet that needs acceleration, determining not to perform accelerated transmission on the data in the first data packet.

10. The method according to claim 9, wherein after receiving the start acceleration command, the method further comprises:

receiving a stop acceleration command, wherein the stop acceleration command carries characteristic information of a data packet for which acceleration needs to be stopped.

11. The method according to claim 8, wherein determining whether to perform accelerated transmission on data in the first data packet comprises:

detecting whether the first data packet carries an acceleration indication; and
if the first data packet carries the acceleration indication, determining to perform accelerated transmission on the data in the first data packet; or
if the first data packet does not carry the acceleration indication, determining not to perform accelerated transmission on the data in the first data packet.

12. The method according to claim 11, wherein before detecting whether the first data packet carries an acceleration indication, the method further comprises:

receiving a start data packet detection command, wherein the start data packet detection command is used to instruct to detect whether a data packet carries the acceleration indication.

13. The method according to claim 12, wherein after receiving the start data packet detection command, the method further comprises:

receiving a stop data packet detection command, wherein the stop data packet detection command is used to instruct to stop detection on whether a data packet carries the acceleration indication.

14. The method according to claim 8, wherein the method further comprises:

when accelerated transmission of a data packet is supported, sending in an interface establishment process a message indicating that accelerated transmission of a data packet is supported; or
receiving an acceleration capability query message, wherein the acceleration capability query message is used to query whether accelerated transmission of a data packet is supported, and if accelerated transmission of a data packet is supported, sending a message indicating that accelerated transmission of a data packet is supported.

* * * * *